United States Patent [19]

Ballas et al.

[11] 4,054,992

[45] Oct. 25, 1977

[54] ROTARY CUTTING ASSEMBLY

[75] Inventors: George C. Ballas; Thomas N. Geist, both of Houston, Tex.

[73] Assignee: Weed Eater, Inc., Houston, Tex.

[21] Appl. No.: 641,969

[22] Filed: Dec. 18, 1975

Related U.S. Application Data

[63] Continuation of Ser. No. 474,713, May 30, 1974, abandoned, which is a continuation-in-part of Ser. No. 347,997, April 5, 1973, Pat. No. 3,859,776, which is a continuation-in-part of Ser. No. 352,580, Jan. 8, 1973, Pat. No. 3,826,068, which is a continuation-in-part of Ser. No. 207,198, Dec. 31, 1971, Pat. No. 3,708,967.

[51] Int. Cl.² ............................................. B26B 27/00
[52] U.S. Cl. .................................... 30/276; 56/12.7; 56/295
[58] Field of Search ............... 56/295, 12.7, 17.5; 172/15, 16; 30/276; 15/180

[56] References Cited

U.S. PATENT DOCUMENTS

| 3,693,255 | 9/1972 | Langenstein | 56/295 X |
| 3,708,967 | 1/1973 | Geist et al. | 56/295 X |
| 3,831,278 | 8/1974 | Voglesonger | 56/12.7 X |

FOREIGN PATENT DOCUMENTS

| 1,281,450 | 12/1961 | France | 56/12.7 |
| 6,601,419 | 3/1969 | Germany | 56/12.7 |
| 6,938,265 | 10/1967 | Germany | 56/12.7 |

*Primary Examiner*—Jay N. Eskovitz

[57] ABSTRACT

Apparatus is provided for cutting vegetation with a flexible non-metallic string-like member in the manner of a flail. A circular body with one or more peripheral apertures is concentrically mounted on the shaft of an electric motor for rotation in a cutting plane, and a section of non-metallic line is interconnected with the circular body member and passed through the peripheral aperture to form the flail. The line may be press-fitted into one or more grooves which may further communicate with apertures or windows in the rim of the circular body. Alternatively, the line may be either a single section of line, or it may be two separate sections of line.

17 Claims, 7 Drawing Figures fig.1 fig.2 fig.3 fig.4 fig.5 fig. 6 fig. 7

ROTARY CUTTING ASSEMBLY

RELATED PATENT APPLICATIONS

This is a continuation of co-pending U.S. patent application Ser. No. 474,713, filed May 30, 1974 and now abandoned, which is a continuation-in-part of a co-pending U.S. patent application Ser. No. 347,997, filed Apr. 5, 1973 and issued Jan. 14, 1975 as U.S. Pat. No. 3,859,776 and which, in turn, is a continuation-in-part of a co-pending U.S. patent application Ser. No. 352,580, filed Jan. 8, 1973 and issued July 30, 1974 as U.S. Pat. No. 3,826,068, and which, in turn, is a continuation-in-part of the then co-pending U.S. patent application Ser. No. 207,198, filed Dec. 31, 1971 and issued Jan. 9, 1973 as U.S. Pat. No. 3,708,967.

BACKGROUND OF THE INVENTION

This invention relates to an improved cutting assembly in the form of a rotary head for a rotary lawn mower, edger, trimmer or the like. The preferred embodiments are in the form of portable hand-held type lawn mowing and edging tools wherein the cutting element is safe and in most uses and avoids the hadardous conditions created by prior art devices.

The prior art is prolix with attempts at solutions of to provide a safe, efficient and simply constructed rotary head for rotary lawn mowers, edgers, trimmers and the like. Heretofore, the rotary head, or cutting blade, of rotary lawn mowers, edgers and the like, has comprised a rotating metal knife blade which is rotated at sufficient speeds to effect cutting of grass, weeds or the like. However, such blades create hazardous conditions in that when they strike certain objects they act upon those objects in a fashion to create and project dangerous missiles which may strike the operator or individuals in the area of work.

Various attempts have been made to overcome the aforesaid hazardous conditions created with rigid type metal cutting blades of the prior art and, in particular, attempts have been made to utilize some type of flexible flail-like member which will have sufficient resiliency so as not to project impacted rocks and other objects at dangerous velocities. Most of these resilient type cutting elements of the prior art suffer a disadvantage in that mere resiliency alone is not sufficient to insure that the dangerous conditions will not be created when rotation is effected at desired cutting speeds. Further, resilient cutting members of the type represented in the prior art have no cut vegetation as well as the metal blades hereinbefore described, and have not enjoyed commercial success for this reason.

The result has been that most of the type of lawn edging and trimming around trees and the like, which would otherwise be damaged by the metal blades, must be done manually, which is both laborious and time consuming.

There is depicted and described in the following West German petty patents Nos. 6,919,841, 6,919,842, 6,919,843, 6,919,844, 6,938,265 and 7,043,648 one or more embodiments of a lawn mowing or trimming device having a disc-like head member arranged to be rotated by an electric motor, and containing a spool which is housed therein in coaxial relationship to the shaft of the motor. A length of flexible non-metallic line is coiled about the spool, whereby its free traveling end extends generally peripherally from the spool and head, and whereby such free traveling end will be swung arcuately about upon actuation of the motor to cut adjacent vegetation in the manner of a flail.

Use of the German device has revealed that, under ideal operating conditions, a length of flexible non-metallic line or string may be used to cut or trim grass and other light-weight vegetation with reasonable effectiveness. Furthermore, a cutting device of this type possesses a significant safety advantage with respect to the more conventional blade-type cutters, in that it does not cause stones or other solid objects to be discharged in the same dangerous manner, and it is almost completely incapable of causing any significant injury to persons or pets struck by the flailing cutting string. In fact, it is a reasonable statement that the German device will actuatlly cut substantially only the vegetation to which it is directed.

On the other hand, the German device is also subject to certain disadvantages of a magnitude such as to severely limit if not destroy its practical value. In the first place, although it is reasonably capable of cutting light-weight vegetation it is almost completely useless for any other task. In the second place, it will only cut such vegetation if growing relatively sparsely, and it cannot effectively handle even light-weight vegetation if encountered in a rank condition. A more serious disadvantage, however, is that, for a variety of non-obvious and complex reasons, the German device experiences a breakage rate with its cutting strings which is so high as to keep such a device from having much practical value.

It will be readily apparent from a consideration of the teachings hereinafter provided that a cutting string which is free from internal flaws or other defects will not usually break except as a result of being struck against or across a relatively immovable object. The cutting string may, of course, be formed of a metal wire or heavy strap in order to provide it with a tensile strength sufficient to resist such impact, but such a string will create substantially the same dangerous conditions which exist when the cutting element is a rigid blade or the like. Thus, the safety advantages which are present with the German device are directly derived from the same design feature which is the reason for excessive string breakage, i.e., the fact that the cutter used by the German device is a light-weight plastic cutting line having a relatively small diameter, and therefore relatively incapable of cutting any but the lightest and sparsest vegetation.

The disadvantages of the prior art, and especially the aforementioned German device, have been overcome with structures devised according to teachings contained in the aforementioned copending patent applications Ser. No. 347,997 and Ser. No. 321,580, and commercially acceptable embodiments of a vegetation cutter and the like have been proposed which are not only fully capable of cutting vegetation under most operating conditions,, but which are also fully capable of other tasks completely beyond the capabilities of the German device, such as cleaning dead leaves, trash and other such debris from along fences, walls and the trunks or stems of trees and bushes. More particularly, however, the apparatus described in these copending patent applications are capable of operation with a much lower breakage rate for their cutting strings, without any sacrifice whatsoever of the safety features and advantages hereinbefore accorded to the aforementioned German cutting device.

It is well known that there is a substantial market for good quality apparatus which can be made commercially available at a reasonable price. Accordingly, trimmer devices constructed according to the concepts and teachings set out in the aforementioned copending patent applications have enjoyed substantial commercial acceptance for the reasons hereinbefore set out. Nevertheless, it is also well known that there is a concurrent market for devices of a lesser quality if they can be made availabe at a substantially lower price. Thus, the aforementioned trimmers of the prior art continue to enjoy substantial sales notwithstanding their tendency to experience a breakage rate which is undesirable to most users of this type of equipment.

It should be understood that the replacement cost of the cutting lines for this type of trimmer is not a particularly onerous burden for the average user. Instead, it is the inconvenience of continual replacement of broken cutting lines which is the principal disadvantage, inasmuch as this requires either partial disassembly of the trimmers of the prior art or else the stubs of broken strings are required to be removed before new strings may be attached and the trimmer restored to operation.

These disadvantages of the prior art have been substantially reduced by the present invention, and novel trimming apparatus is herewith provided wherein string replacement is not only greatly facilitated but wherein the breakage rate is substantially reduced.

SUMMARY OF THE INVENTION

This invention is for an improved cutting assembly for use as a rotary lawn mower, edger, trimmer or the like. It includes a body member arranged for rotation about an axis generally perpendicular with or normal to the cutting plane. It preferably includes at least two non-metallic cutting lines extending from the body member for arcuate flail-like movement in the cutting plane, although a single line may be effective for present purposes under proper circumstances. Each line is characterized by having an effective working length to diameter ratio, and is made of a non-metallic composition such as to render the line flexible and yielding to the extend that it is substantially incapable of causing damage to injury when impacting against persons, animals, trees, etc. Preferably, the effective working length to diameter ratio of the line is at least 20:1. Certain features of the invention include means for detachably securing the line or lines to the body member so that the same may be replaced with a minimum of effort and time, as will hereinafter be explained. In at least one embodiment, however, means may also be included with the body member for storing supplies of line in the non-working condition, whereby the effective working length of the line or lines may be lengthened at desired times as the working length becomes shortened during use thereof. Another particularly significant feature is that the configuration of the cutting heat is such as to prevent angular deformation or "kinking" of the cutting lines, as will hereinafter be explained in detail.

In its broadest concept, any type of motor may be employed for purposes of the present invention to rotate either of the aforementioned two styles of head assemblies. However, an electric motor is cheaper and of lighter weight than a gasoline-driven engine and is therefore far more suitable for a cutting device intended to be employed in residential-size plots or areas and the like, wherein lesser cutting capabilities are normally required. Accordingly, it is a feature to employ an electric motor having particular characteristics especially suitable for such purposes.

As will hereinafter be explained in detail, another advantageous feature is that the cutting head, regardless of its configuration, will preferably include provision for at least two line bearing surfaces aligned with the axis of rotation of the head and spaced therefrom within the cutting plane defined by such rotation. It should be noted, however, that the cutting line extends entirely within the cutting plane while the head is rotated, whereas this is definitely not the case with either the apparatus depicted in the aforementioned German patents or the other prior art hereinbefore mentioned, whereby the shock of impact on vegetation and so forth is better conducted and dispersed along the entire length of the extended portion of the cutting line.

Not only does the unwound portion of the cutting line in the German patents follow a tortuous path, from the coil to the outer perimeter of the housing, it should also be noted that, as hereinbefore explained, it is pinched or wedged between two adjacent tooth-like projections located on such perimeter. As will hereinafter be illustrated in detail, the cutting line in the present invention is disposed to normally bear on only one abutting curvilinear surface in the housing, and this surface precedes rather than trails the cutting line as the head revolves in the cutting plane. Thus, the shock of impacts on the cutting head are much less prone to be concentrated at any single point along the cutting line, which is another reason why breakage does not occur with the same high frequency as has been the experience with apparatus of the type depicted in the German patents. Also, when the cutting line is retarded by encountering an obstruction, the leading surface moves away from the line before the trailing surface moves into bearing engagement with the line, whereupon the line will again bear on only one supporting curvilinear surface when the shock of impact is received.

In summary, therefore, it is a feature of the present invention to provide cutting means of the type hereinbefore described with an electric motor which is capable of rotating the head of the cutting means at velocities such that the cutting lines will effectively cut weeds, grass and grass-like vegetation occurring in moderate abundance or density.

It is also a feature to provide a rotatable cutting means with one or more flexible non-metallic line means, and with an electric motor for swinging such line means at a tip velocity functionally related to their free traveling lengths and their cross-sectional diameter.

It is a further feature of the present invention to provide a length of non-metallic flexible line extending tangentially therefrom in said cutting plane, electrically-actuated means for revolving said coiled portion of said line about said axis to impart a tip velocity to said extended end of at least a minimum preselected velocity and not greater than a maximum preselected velocity, and means for receiving said extended end and linearly distributing the shock of any impact received thereby.

It is also a feature to provide an electrically rotatable cutting assembly having one or more non-metallic flexible line members with free traveling ends extending peripherally therefrom, and further having provision for maintaining a generally curvilinear configuration to said ends during any backlash about the periphery of said cutting assembly.

These and other features and advantages of the present invention will become apparent from the following detailed description wherein reference is made to the figures in the accompanying drawings.

IN THE DRAWINGS

FIG. 1 is a view showing an operator operating portable cutting apparatus embodying one or more features of the present invention and having cutting strings exteding peripherally from a rotating circular head assembly or the like.

FIG. 2 is a larger pictorial representation of the cutting apparatus depicted in FIG. 1, wherein the mechanical features and configuration of such apparatus is illustrated in greater detail.

DETAILED DESCRIPTION

Figures 1, 2:
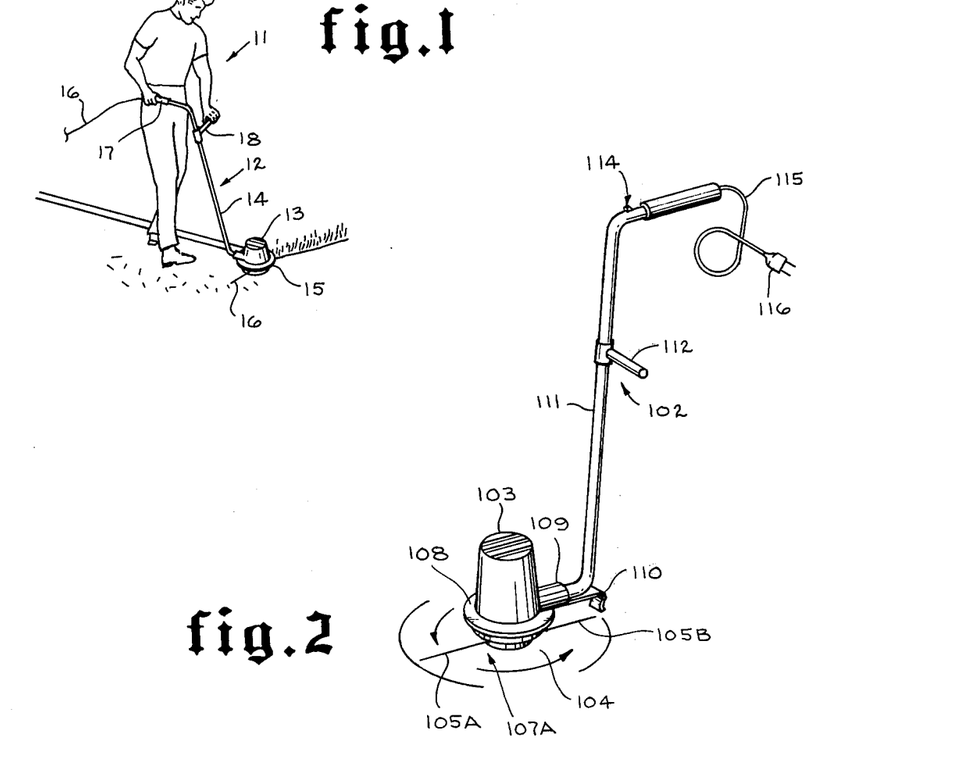

Referring now to FIG. 1, an operator 11 is shown carrying a portable type lawn mowing and edging device generally designated by the numeral 12 and which is of the type preferred for use in locations where electrical power is reasonably available to the operator 11. Accordingly, the apparatus may be composed of a tubular member of casing 14 having an electric motor 13 of suitable design mounted at one end, and having a two-string circular housing or rotatable cutting element 15 secured to the shaft of the motor 13. An electrical cable 16 or other suitable conductor may be located in the casing 14 and connected at its lower end to the motor 13. Accordingly, the opposite end of the cable 16 may extend out of the upper or other end of the casing 14 for connection with a suitable source of electric power (not depicted in FIG. 1).

As indicated in FIG. 1, the edging device 12 is preferably provided with upper and lower handles 17 and 18 of suitable design, whereby the device 12 is both portable and manipulatable. Accordingly, the device 12 may be carried, turned, and tilted as desired or required by irregularities in the topography and vegetation growing thereon.

Referring now to FIG. 2, there may be seen a larger and more detailed pictorial representation of the apparatus depicted more generally in FIG. 1. More particularly, the apparatus or vegetation cutter 102 depicted therein may be seen to include a hollow casing 111 or the like with a two-string circular cutting head 104 which is rotated by the shaft of an electrical motor 103 of suitable design mounted at the lower end of the casing 111. As depicted in FIG. 2, the casing 111 may be easily carried and maneuvered by merely a pair of handles 112 and 113 suitably located on the casing 111.

Referring more particularly to FIG. 2, the cutter 102 may be further seen to include a pair of flexible cutting strands 105A and 105B extending laterally from the cutting head 104 through windows 107A and 107B of suitable configuration, a distance which is a function of the present invention as will hereinafter be explained.

As further indicated, the housing of the electric motor 103 preferably includes a sleeve portion 109, for receiving and accommodating the lower and insertable dogleg end of the casing 111, and may further have a circular flange portion or bumper 108 for preventing the cutting head 104 from being brought into injurious contact with a wall or tree during its rotation by the motor 103.

Power may be applied to the motor 103 through a conventional electrical-type insulated cord or conductor 115, having an appropriate plug 116 at one end, and having its other end (not depicted) passed through the casing 111 for connection with the motor 103. An appropriate on-off switch 114 may conveniently be located adjacent the handle 113, at the upper end of the casing 111, for interconnection with the conductor 115 and motor 103. In addition, a knife member 110 is preferably attached to the housing of the motor 103 for trimming the cutting strands 105A and 105B to the proper length, as will hereinafter be explained in detail.

When the motor 103 is inactivated and the rotary body 104 is in a static condition, the two ends of the cutting strand or line 105A and B will to limply dangle or flexibly extend from the equally spaced-apart windows 107A and B to the extent permitted by the inherent stiffness characteristics of the material from which the lines are formed. When the rotary body 104 is rotated at normal operating velocities, however, the line ends 105A and B will tend to stand out rigidly (but also yieldably) from the periphery of the rotary body 104 as illustrated in FIG. 2.

The cutting lines 105A and B may be composed of a variety of suitable materials as, for example, an elastoplastic extrusion which has been stretched to align the molecules axially. An example of such line is a nylon monofilament of the type commonly used for fishing line. However, other lines may be used, as for example, yarn, cord, rope, twine, braided line, or monofilament, whether described as elastoplastic, elastomeric, natural fiber, or synthetic fiber, and whether compounded of several materials. Nevertheless, there are certain parameters within which the lines must fall in order to be effective.

The cutting lines 105A and B should peferably have sufficient fatigue, abrasion, impact resistance, and tensile strength to allow a reasonable service life, and should be as small a diameter as is consistent with the foregoing parameters so that the most effective cutting edge is provided for cutting grass, weeds, or the like. The lines 105A and B should further preferably be as light weight as possible, so that when the line shears or breaks during use and pieces are thrown from the cutter head 105, such pieces will travel only a limited distance and will strike persons or other objects in the immediate vicinity with harmless impact if any.

Effective cutting may be achieved with lines 105A and B formed of a metal, and such lines will also have a greater tensil strength than if formed of nylon or the like. Metallic lines are more subject to breakage because of fatigue, however, and the relatively greater mass of a piece of metal cutting line will cause it to travel like a projectile for a considerable distance. In addition to this dangerous feature, the fact that the greater mass of a metallic line requires a larger heavier motor 103 of greater power makes the use of metallic lines 105A and B undesirable for present purposes. On the other hand, the relatively small mass of a line 105 formed, for example, of an extruded nylon monofilament, creates complex design problems which must be effectively solved to achieve effective cutting of lush vegetation, and this will become even more apparent when it is recognized that only the last one full inch or so, of each of the lines 105A and B, actually impacts against the vegetation sought to be cut.

It has been empirically determined that there is a functional relationship between the weight of the tip (outer one inch) of a cutting line 105, its cross-sectional diameter, its swing radius, and the arcuate velocity of the line 105 at its tip. Thus, an effective length-to-diameter ratio for a nylon monofilament line or the like will often be greater than 30:1, and it has been found that the best cutting lines for the purposes of this invention are extruded nylon line, such as fishing line, having a diameter of about 0.062 inches for cutting grass and about 0.125 inches for cutting weeds.

Although the aforesaid cutting lines are essentially flexible and yielding while in the static condition, they assume a rigid posture under dynamic conditions of rotation, as shown in Fig. 1. The normal rotating speed is on the order of 3000–7000 rpms. During rotation of the cutting lines in the dynamic condition, the cutting lines are caused to become taut and thereby increase the apparent rigidity of the line. These effects are caused by both the rotational speed and the tip speed of the cutting element.

In operation, the apparatus depicted in FIGS. 1 and 2 is assembled as shown with cutting lines 105A and B extending yieldably radially outwardly therefrom to the desired lengths. Thereafter, rotary body 104 is rotated according to the desired rotational speed, whereby as a result, lines 105A and B will extend radially outwardly in a rigid manner from body 104 within its cutting plane, whereby cutting, lawn edging, or the like may be accomplished. As lines 105A and B tend to wear away and become shortened through use, they can thereafter be restored to their original proper cutting length by terminating rotation of rotary body 104, and by unreeling the lines 105A and B to extend them as desired, as will hereinafter be explained in detail.

It will thus be apparent that this invention provides the art with a cutting device which can quickly, easily, and efficiently cut grass, weeds, and the like; over, under, around, and between rocks, culverts, and the like; and can cut around and between trees, posts, bushes, buildings, and other stationary objects, or the like. Further, this apparatus will be particularly safe for both the operator and others in the vicinity, in that the hazardous conditions present when prior art devices are used has been essentially eliminated. By making the apparatus available in a portable embodiment, the cutting plane can be effected in any direction so as to accommodate both cutting and trimming operations as heretofore described, thereby eliminating the need for manual labor in certain difficult cutting operations.

The apparatus of this invention can also be used successfully in yard trimming and cleaning operations where there is considerable debris, such as bottles, cans, papers, wood, wire and the like, without creating a dangerous condition in that the cutting elements of this device do not create missiles of such trash. Because of the nature of the cutting element of this invention, such objects are not thrown, but rather the cutting strings 105A and B act in a resilient fashion, so as not to impart sufficient force to cause such objects to become missiles; or if they are thrown, they are projected at only a very low velocity as compared with cutting devices heretofore in use. Experience has shown that in operating an apparatus of this device with lines of the type described, the cutting lines may accidentally come in contact with the operator's shoes, articles of clothing, or the like, without serious injury as would be the case with prior art devices. Further, in the event a portion or gragment of the cutting line is thrown from the apparatus, such portions possess low mass and low kinetic energy and, therefore, quickly lose velocity and energy, thus rendering the same virtually harmless.

It has been determined that, for the embodiment of the invention depicted in FIGS. 1 and 2, the optimum parameters will call for nylon lines having diameters of not substantially less than 0.035 inches or substantially more than 0.100 inches, and a cutting length (the length extending beyond the periphery of the cutting head) of substantially 5–9 inches. In addition, the preferred driving means will be a non-synchronous electric motor capable of maintaining an rpm rate of 3,500–7,00 during normal use of the equipment.

In a more precise relationship, the optimum rpm is preferably stated in terms of tip velocity (since it is the terminal inch of each line that is effective for present purposes), and may thus be stated as follows:

$$V_{min} = 5{,}600/\sqrt[3]{d} \text{ or } 5{,}600/d^{0.331}$$

and $$V_{max} = 21{,}000/\sqrt[16]{d} \text{ or } 21{,}000/d^{0.063}$$

wherein V is the tip velocity of the cutting lines in feet per minute, and d is the cross-sectional diameter, in inches, of a monofilament extruded nylon line.

Accordingly, if the line has a diameter of 0.035 inches, the minimum tip velocity should not be less than 17,000 feet per minute, and the maximum velocity should not exceed 26,000 feet per minute. If the line diameter is 0.065 inches, the tip velocities will preferably be between 14,000–25,000 feet per minute, and if the line diameter is 0.100 inches, the tip velocity will be between 12,000–23,000 feet per minute.

As hereinbefore mentioned, the cutting effectiveness is a function of the weight of the lines as well as their tip velocity, and thus it has been determined that in a preferred embodiment of the present invention as depicted in FIG. 1 and 2, the lines will be formed of a material having a specific gravity of not substantially less than 0.90 nor substantially greater than 1.60. Since cutting is effected by substantially only the last or furthest inch of each end of the line, it may be stated that the lines should be a dimension such that each line has a kinetic energy of not substantially less than 0.03 foot-lbs., nor substantially more than 7.14 foot-lbs., when the equipment is in operation.

It has further been determined that the extended length of the cutting lines is also a direct function of the size of the cutting head, although the precise explanation for this is not immediately apparent. In any event, it can be stated that this provides that the cutting lines should have a free traveling or unsupported length of not substantially less than 0.50 times the diameter of the cutting head, nor substantially more than 2.2 times such diameter, and this appears to be especially significant in he operation of the embodiment of the invention depicted in FIGS. 1 and 2.

Figure 3:
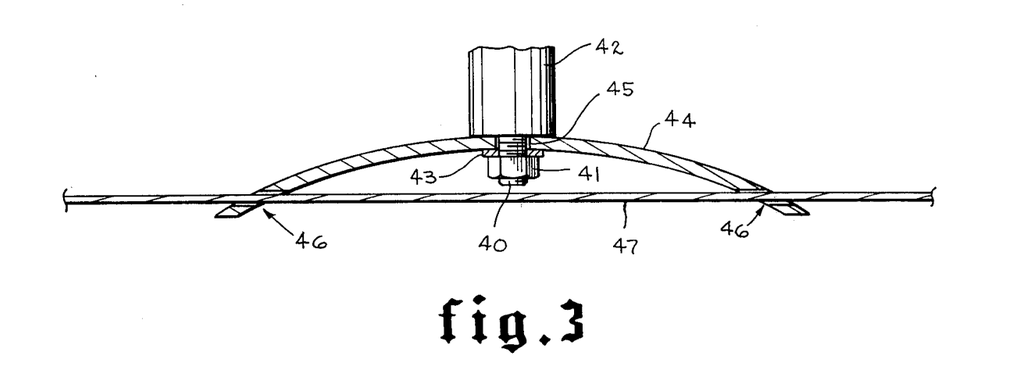
FIG. 3 is a pictorial side view, partly in cross section, of one type of structure suitable for use with the apparatus depicted in FIGS. 1 and 2.

Referring now to FIG. 3, there may be seen a pictorial side view (partly in cross-section) of an improved form of the cutting head suitable for use with the apparatus depicted in FIGS. 1 and 2. More particularly, a circular bowl-like member 44 is preferably centrally fastened to the motor shaft 42 by means of a washer 43 and lock nut 41 threadably engaging the threaded bolt-like end 40 of the motor shaft 42 extending through a central aperature 45 in the bowl-like member 34. Further, the bowl-like member 44 is preferably, although not necessarily, mounted on the end of the motor shaft 42 whereby its concave surface is directed away from the trimmer 102 depicted in FIG. 2.

The bowl-like member 44 may be seen to have a plurality of string apertures 46 each mounted at opposite sides of the perimeter of the bowl-like member 44, whereby a cutting string 47 may be inserted through the string apertures 46 and extended diametrically across the concave surface of the bowl-like member 44. In this configuration, the cutting string 47 may be easily and quickly attached or removed from the bowl-like member 44, but will nevertheless maintain its position therein during use of the trimmer 102 for cutting vegetation. On the other hand, this configuration of the apparatus also permits for minimum deformation of the cutting string 47 when it is interconnected with the bowl-like member 44.

Figure 4:
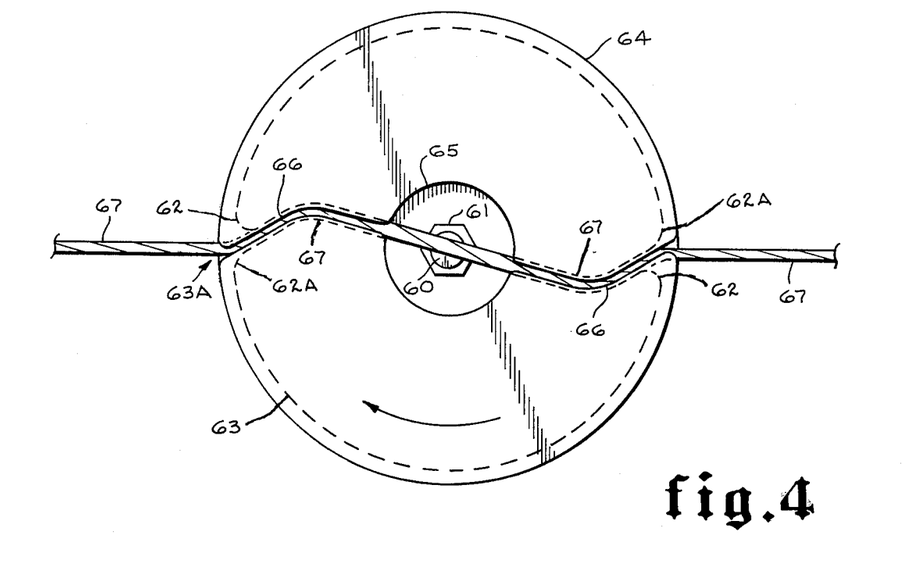
FIG. 4 is a pictorial bottom view of another type of structure suitable for use with the apparatus depicted in FIGS. 1 and 2.

Referring now to FIG. 4, there may be seen another disc-like member 64 which is useful to perform the function of the cutting head 104 illustrated in FIG. 2. More particularly, however, this disc-like member 64 may be seen to be provided with a pair of string grooves or recesses 66, each extending from a circular central recess 65 in the disc-like member 64 to opposite points on its perimeter. Each of these two grooves is slightly smaller than the cutting string 67 laced therethrough, but is enlarged below the surface of the disc-like member 64 to permit the cutting string 67 to fit therein in a relatively slidable manner. Accordingly, the cutting string 67 is affixed to the disc-like member 64 by pressing it between the narrowed edges of the two grooves 66. As may be further seen in FIG. 4, the two grooves 66 are peferably curved in opposite directions to prevent the cutting string 67 from sliding away from the disc-like member 64 if one end of the cutting string 67 is broken or shortened.

Referring again to FIG. 4, it will be seen that the disc-like member 64 may be conveniently mounted coaxially on the bolt-like end 60 of a motor shaft (not depicted) by means of a lock nut 61. Accordingly, the central recess 65 is preferably deep enough to permit the cutting string 67 to be laced across the bolt-like end 60 of the motor shaft without deformation of the cutting string 67.

Figure 5:
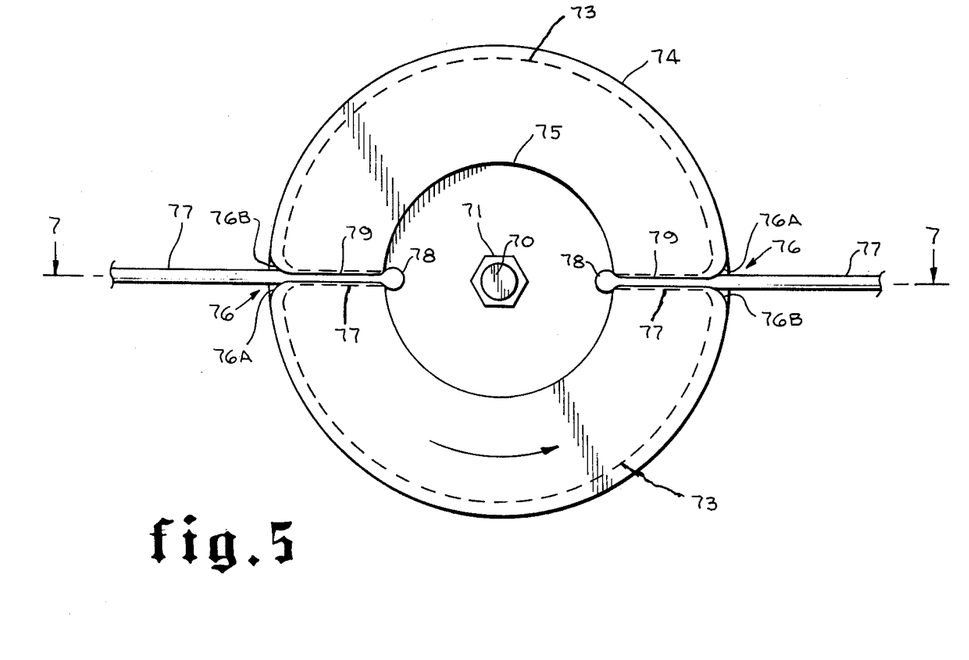
FIG. 5 is a pictorial bottom view of another type of structure suitable for use with the apparatus depicted in FIGS. 1 and 2.

Referring now to FIG. 5, there may be seen a pictorial bottom view of another form of cutting head 104, such apparatus comprising a circular disc-like member 74 having a relatively large central recess 75, and further having a pair of peripheral string apertures 75 opposite each other and communicating with the central recess 75 by means of grooves 79. Each of the grooves 79 may be seen to contain a cutting string 77 having an enlarged knob-like portion 78 at one end and located within the central recess 75, and having a flail-like end extending outwardly through the string aperture 76 from the periphery of the disc-like member 74. The disc-like member 74 is centrally mounted on a motor shaft (not depicted) by means of a lock nut 71 threadably engaging the bolt-like end 70 of the motor shaft, whereby rotation of the disc-like member 74 will permit the flail ends of the cutting strings 77 to sever vegetation in the manner hereinbefore described.

As also hereinbefore described, the cutting strings 77 are preferably formed of nylon or some other suitable thermoplastic material. It is well known that when heat is applied to such material, it tends to melt. Accordingly, if heat is applied to one end of a section of line formed of such material, the heated end will tend to melt to a blob-like configuration, and thus the knob-like end 78 of the cutting strings 77 depicted in FIG. 5 may be easily and conveniently formed in this manner whenever replacement of a cutting string 77 is required.

Referring again to FIG. 5, it will be seen that the surface edges of the grooves 79 are spaced closer together than the diameter of the cutting lines 77, but that such grooves 79 are enlarged below the surface of the disc-like member 74 to slidably accommodate such cutting string 77 after it has been disposed within the grooves 79. Accordingly, when a cutting string 77 is required to be replaced, the knob end 78 of the cutting string may be formed as hereinbefore described, and the cutting string 77 may be then attached to the disc-like member 74 by pressing it into the groove 79. Alternatively, the section of cutting string 77 may be pressed into the groove 79, and the knob end 78 thereafter formed as previously described. Since the cutting string 77 is slidable within the groove 79, it may be drawn outwardly of the perimeter of the disc-like member 74 until the enlarged knob-like end 78 prevents further movement of the cutting string 77.

Figure 6:
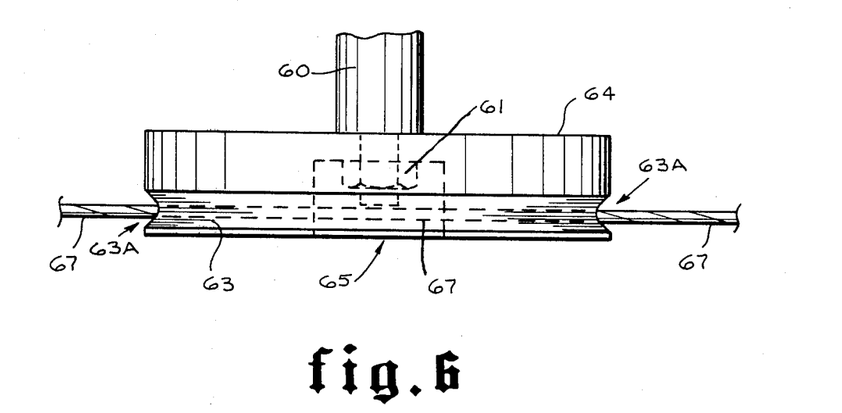
FIG. 6 is a pictorial side view, partly in cross section, of the apparatus depicted in FIG. 4.

Referring now to FIG. 6, there may be seen a pictorial side view of the cutting head 64 depicted in FIG. 4. In particular, it may be seen that the cutting head 64 is preferably provided with a peripheral groove 73 about its circumference for the purpose of better containing and supporting the flail portion of the cutting line 67, in the event of either backlash or frontlash of the cutting line 67 about the cutting head 64.

Figure 7:
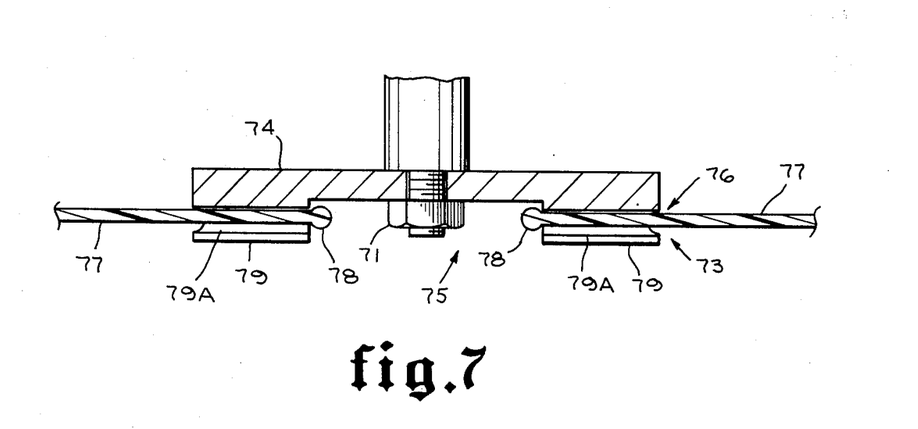
FIG. 7 is a pictorial side view, partly in cross section, of the apparatus depicted in FIG. 5.

Referring now to FIG. 7, there may be seen a pictorial side view, partly in cross section, showing certain details of the cutting head 74 which are not clearly apparent in FIG. 5. In particular, the cutting head 74 may also be seen to have a peripheral groove 73 about its circumference for better supporting the cutting lines 77 in the event of either frontlash or backlash. In addition, it will be seen how the cutting strings 77 may be press-fitted through the narrower slot-like surface apertures 79 to lie within larger or broader undercut channels 79A extending from the central recess 75 to the peripheral groove 73.

Referring again to FIGS. 4 and 6, it will be seen that since the grooves or slots 66 are curvilinearly positioned in the cutting head 64, the peripheral openings 63A thereby provided in the rim of the cutting head 64 will be formed by spaced-apart curvilinear surfaces 62 and 62A which continue outwardly to form the surface of the groove 63. The extended sections of the cutting line 67 will normally tend to bear on the surfaces 62 leading the cutting line 67 during rotation of the cutting head 64. However, the trailing surfaces 62A are preferably formed with a larger radius of curvature than that of the leading surfaces 62, for better supporting the cutting line 67 in the event of backlash.

Referring again to FIGS. 5 and 7, it will be seen that, in contrast to the structure depicted in FIGS. 4 and 6, the two grooves 79 are preferably located along the diameter of the circular cutting head 74, and that the cutting strings 77 will therefore each be equidistantly disposed between the spaced-apart line bearing surfaces 76A-B which form the peripheral apertures or windows 76. Nevertheless, the two surfaces 76A-B are each preferably curved within the cutting plane, whereby they will provide support to the cutting lines 77 in the event of either frontlash or backlash, as hereinbefore explained.

It will be apparent from the foregoing that many other variations and modifications may be made in the structures and methods described herein without substantially departing from the essential concept of the present invention. Accordingly, it should be clearly understood that the forms of the invention described herein and depicted in the accompanying drawings are exemplary only and are not intended as limitations in the scope of the present invention.

What is claimed is:

1. Apparatus for cutting vegetation and the like comprising
    driving means having a rotatable shaft extending therefrom perpendicularly to a cutting plane,
    a head member fixedly mounted on said shaft and having a recess located therein to provide an opening extending inwardly from one side thereof and said head member further having at least one peripheral aperture providing in part a passageway communicating with said recess and said passageway residing within said head member,
    at least one non-metallic flexible line member slidably received in close confinement within the passageway and extending from said recess radially outwardly and at least partially across said head member and through said peripheral aperture into said cutting plane, and
    means on said head member for securing said line member against slidable movement from said aperture into the cutting plane but permitting selective withdrawal of said line member from said aperture.

2. The apparatus described in claim 1, wherein said head member further comprises
    a dish-like member concentrically mounted on said shaft of said driving means and having a concave surface on one side and a pair of apertures equally spaced apart about the periphery thereof,
    said dish-like member being concentrically disposed on said shaft with said concave surface turned opposite to said driving means, and
    said flexible line member being disposed diametrically across said concave surface of said dish-like member with each end inserted through one of said peripheral apertures to extend outwardly and oppositely in said cutting plane.

3. The apparatus described in claim 1, wherein said head member comprises
    a flat disc-like circular member concentrically mounted on said shaft of said driving means and having a circular concentric recess and a pair of grooves traversely extending therefrom across the side opposite said driving means to the periphery of said disc-like member,
    said line member being disposed across said opposite side of said disc-like member and press-fitted into said grooves for extension therefrom radially from the periphery of said disc-like member in said cutting plane.

4. The apparatus described in claim 3, wherein said grooves have curvilinear configurations and are narrower than the thickness of said cutting line.

5. The apparatus described in claim 4, wherein said disc-like body is further provided with another line-bearing groove circumferentially about its perimeter for receiving and supporting said ends of said line member during rotation of said disc-like body in said cutting plane.

6. The disc-like body described in claim 5, wherein said traversely extending grooves join and cooperate with said circumferential groove to form oppositely spaced-apart peripheral windows each composed of a pair of curvilinear line-bearing surfaces located in and perpendicular to said cutting plane.

7. The apparatus described in claim 6, wherein said ends of said line member each normally bear on the leading one of the respective pair of said curvilinear line-bearing surfaces during rotation of said disc-like body in said cutting plane.

8. The apparatus described in claim 7, wherein said curvilinear line-bearing surfaces of said disc-like body each have a radius of curvature great enough to support said ends of said line member against angular deformation thereof.

9. The apparatus described in claim 1, wherein said head member and line member comprise
    a disc-like circular body concentrically mounted on said shaft of said driving means and having a pair of oppositely arranged slot-like peripheral apertures communicating with a circular concentric recess in the side of said body opposite said driving means,
    a first section of flexible line press-fitted into one of said grooves with one end thereof provided with a thermally-formed knob for limiting slidable movement of said first section of line outwardly of the periphery of said body, and
    a second section of flexible line press-fitted into the other of said grooves with one end thereof provided with a thermally-formed knob for limiting slidable movement of said second section of line outwardly of the periphery of said body.

10. The apparatus described in claim 9, wherein said grooves in said circular body further communicate with window-like apertures formed in the periphery of said body by spaced-apart bearing surfaces perpendicular to said cutting plane and having a radius of curvature at least great enough to support said sections of line against angular deformation during rotation of said body by said driving means.

11. An apparatus for cutting vegetation and the like, comprising:
    a. a head arranged for rotation within a circular periphery and about an axis generally perpendicular with a cutting plane;
    b. said head member having a recess provided thereinto and at least one aperture at a location spaced from the axis and adjacent the circular periphery, and said aperture forming at least in part a passageway within said head member for receiving a line member in close confinement while extending outwardly from said recess through said head member to said aperture;
    c. at least one non-metallic flexible line member extending from said recess across said head member and through said aperture into the cutting plane; and
    d. securing means integral with said head member for holding said line member against slidable movement radially outwardly from said aperture during rotation of said head member.

12. The apparatus of claim 11 wherein said securing means include groove means forming at least a part of said aperture with said line member press-fitted into said groove means.

13. The apparatus of claim 11 wherein said securing means include an enlargement upon said line member at its location within said recess.

14. The apparatus of claim 11 wherein said securing means include groove means forming at least a part of said aperture with said line member press-fitted into said groove means and an enlargement upon said line member at its location within said recess.

15. The apparatus of claim 11 wherein said head member has provided therein said aperture connecting with an enclosed bore-like passageway extending from said recess to traverse said head member to said aperture.

16. The apparatus of claim 11 wherein said securing means include an enlargement upon said line member at its location within said recess, and said enlargement is adapted to abut said head member as said line member is received within said aperture to extend outwardly into the cutting plane.

17. The apparatus of claim 15 wherein said line member is freely received into said head member during placement into said aperture for ready installation and removal from said recess.

* * * * *

UNITED STATES PATENT AND TRADEMARK OFFICE
CERTIFICATE OF CORRECTION

PATENT NO. : 4,054,992
DATED : October 25, 1977
INVENTOR(S) : George C. Ballas & Thomas N. Geist It is certified that error appears in the above-identified patent and that said Letters Patent are hereby corrected as shown below:

Column 1, line 24 for "hadardous" read---hazardous---,
line 26, omit "of", and
line 50, for "no" read---not---.

Column 2, line 31, after "practical" insert---commercial---. and
line 56 for "proposed" read---provided---.

Column 3, line 44, for "to" read---or---.

Column 4, line 28, for "head" read---line---.

line 14, for "or" read "nor"
line 19, for "700", read---7000---, and
line 63, for "he" read---the---.

Column 9, line 5, for "34" read---44---, and
line 55 for "75" read---76".

UNITED STATES PATENT AND TRADEMARK OFFICE
CERTIFICATE OF CORRECTION

PATENT NO. : 4,054,992
DATED : October 25, 1977
INVENTOR(S) : George C. Ballas & Thomas N. Geist It is certified that error appears in the above-identified patent and that said Letters Patent are hereby corrected as shown below:

Column 12, line 48, after "head" insert ---member---.

Signed and Sealed this

Thirtieth Day of May 1978

[SEAL]

Attest:

RUTH C. MASON
Attesting Officer

LUTRELLE F. PARKER
Acting Commissioner of Patents and Trademarks